United States Patent
Ivanyi et al.

(10) Patent No.: US 10,773,727 B1
(45) Date of Patent: Sep. 15, 2020

(54) DRIVER PERFORMANCE MEASUREMENT AND MONITORING WITH PATH ANALYSIS

(71) Applicant: LinkeDrive, Inc., Boston, MA (US)

(72) Inventors: Tibor F. Ivanyi, Pelham, NH (US);
Jeffrey C. Baer, Dover, MA (US);
Sergey L. Eidelman, Bolton, MA (US);
Chad M. Kosterman, Nashua, NH (US)

(73) Assignee: LINKEDRIVE, INC., Boston, MA (US)

( * ) Notice: Subject to any disclaimer, the term of this patent is extended or adjusted under 35 U.S.C. 154(b) by 0 days.

(21) Appl. No.: 16/440,147

(22) Filed: Jun. 13, 2019

(51) Int. Cl.
*G08B 13/00* (2006.01)
*B60W 40/09* (2012.01)
*B60W 50/14* (2020.01)
*G06N 20/00* (2019.01)

(52) U.S. Cl.
CPC ............ *B60W 40/09* (2013.01); *B60W 50/14* (2013.01); *G06N 20/00* (2019.01); *B60W 2050/143* (2013.01); *B60W 2050/146* (2013.01); *B60W 2510/0638* (2013.01); *B60W 2510/0666* (2013.01); *B60W 2510/10* (2013.01)

(58) Field of Classification Search
None
See application file for complete search history.

(56) References Cited

U.S. PATENT DOCUMENTS

| | | | |
|---|---|---|---|
| 4,247,757 A | 1/1981 | Crump, Jr. | |
| 7,389,178 B2 | 12/2008 | Raz et al. | |
| 7,561,054 B2 | 7/2009 | Raz et al. | |
| 8,260,534 B2 | 9/2012 | Henderson et al. | |
| 9,135,759 B2 | 9/2015 | Baer et al. | |
| 9,180,890 B2 | 11/2015 | Lu et al. | |
| 9,747,730 B2 | 8/2017 | Baer et al. | |
| 9,771,073 B2 | 9/2017 | Kwon | |
| 2010/0245064 A1 | 9/2010 | Fleishman | |
| 2011/0054768 A1 | 3/2011 | Sullivan | |
| 2011/0184642 A1* | 7/2011 | Rotz | G01C 21/3469 701/533 |
| 2017/0146362 A1 | 5/2017 | Bai et al. | |
| 2018/0053102 A1 | 2/2018 | Martinson et al. | |
| 2018/0137759 A1* | 5/2018 | Oh | H04W 4/44 |
| 2018/0174485 A1* | 6/2018 | Stankoulov | G09B 19/167 |
| 2018/0319405 A1 | 11/2018 | Heinze et al. | |
| 2019/0286793 A1* | 9/2019 | Patton | H04W 4/021 |
| 2020/0162350 A1* | 5/2020 | Chrapko | G08G 1/096775 |

* cited by examiner

*Primary Examiner* — Julie B Lieu
(74) *Attorney, Agent, or Firm* — Greenberg Traurig, LLP

(57) ABSTRACT

A method for performing driver performance comparisons is enabled, e.g., via in-vehicle capture of performance data from multiple vehicles or drivers. The performance comparisons are enabled via a geohash-based path analysis.

20 Claims, 7 Drawing Sheets

DRIVER PERFORMANCE MEASUREMENT AND MONITORING WITH PATH ANALYSIS

BACKGROUND

Technical Field

This disclosure relates generally to applications and methods that may be implemented in or using a mobile device to teach, measure and reward motor vehicle drivers to operate their vehicles in a fuel-efficient and safe manner.

Background of the Related Art

Mobile devices, such as a smartphone or tablet, have become ubiquitous in today's society. Faster processors, more memory, higher quality gesture-based multi-touch screens, availability of mobile broadband data, and integration of multi-media and GPS chips along with open interface mobile operating systems, have opened the door for creation of a large variety of mobile applications. One such mobile application is a driver coaching application. In particular, and using a technique such as described in U.S. Pat. No. 9,135,759, a driver of a vehicle can use his or her mobile device to facilitate collection and display of real-time performance information to the driver, e.g., to facilitate more efficient fuel usage and economy.

The availability of mobile device-supported in-vehicle data collection and analysis techniques can provide vehicle fleet operators with useful vehicle and/or driver-specific data. Such analysis, for example, would provide a way for interested entities to compare the performance of drivers.

BRIEF SUMMARY

A method, apparatus and system is described for driver performance measuring and comparative analysis. The technique preferably leverages a geohash-based indexing scheme for performance metrics.

According to one aspect, a performance monitoring and comparative analysis method is as follows. For each of a set of vehicles, one or more performance metrics are captured. In one embodiment, the performance metrics are captured in-vehicle as the vehicle is driven over one or more routes. In an alternative, such performance data is received from a third party data source. For each of the one or more routes, geospatial data is received. The geospatial data comprises a hierarchical spatial data structure that subdivides space into buckets of grid shape. A representative data structure of this type is MGRS grid identified by an associated geohash. For each of the set of vehicles, the collected (or otherwise received) performance metrics are associated with buckets of the geospatial data. Thereafter, and responsive to receipt of a query, and with respect a particular route associated with the geospatial data, a comparative analysis of the performance metrics collected from first and second vehicles is then performed. In particular, for the particular route, the buckets through which the particular route passes are identified. Then, a subset of the identified buckets that are common to routes over which the first and second vehicles both passed are identified. The performance metrics for each of the subset of the identified buckets are then retrieved. A given function is then performed over the retrieved performance metrics for at least one of the identified buckets in the subset to provide the comparison. A result of the comparison may then be output.

The foregoing has outlined some of the more pertinent features of the subject matter. These features should be construed to be merely illustrative.

BRIEF DESCRIPTION OF THE DRAWINGS

For a more complete understanding of the disclosed subject matter and the advantages thereof, reference is now made to the following descriptions taken in conjunction with the accompanying drawings, in which.

DETAILED DESCRIPTION

The disclosed method may be practiced in association with a computing infrastructure comprising one or more data processing machines.

Figure 1:
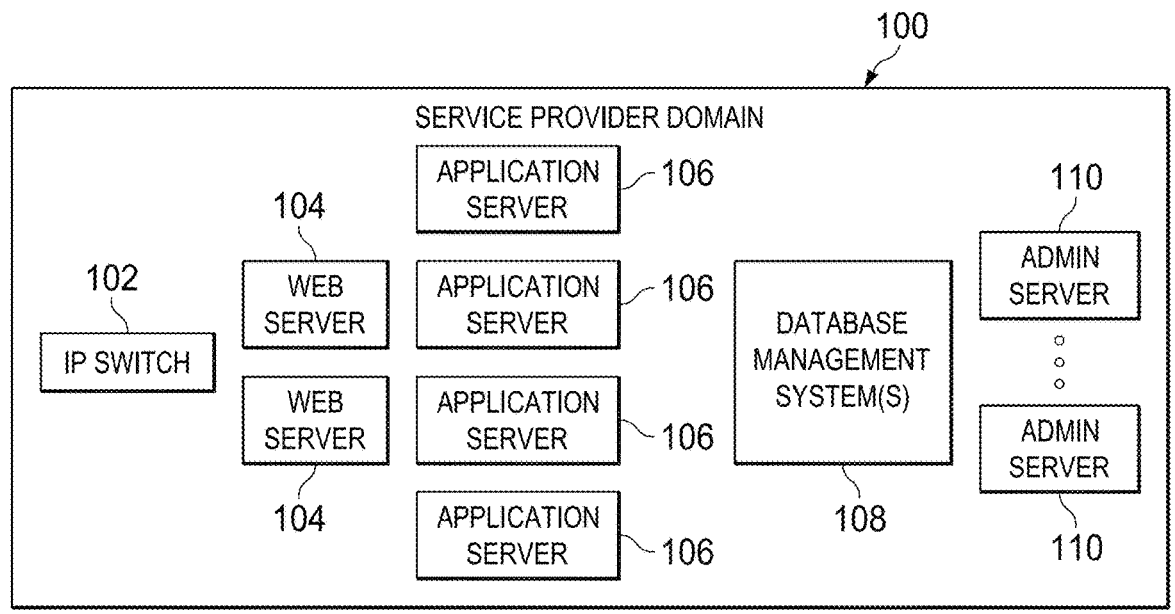
FIG. 1 is a block diagram of a driver measurement and incentive service provider infrastructure in which the techniques of this disclosure may be implemented.

A representative computing infrastructure provides a driver measurement and incentive service for improving fuel-efficiency. A representative service of this type is PedalCoach™ provided by LinkeDrive of Boston, Mass. This type of service (in whole or in part) may be implemented on or in association with a service provider infrastructure 100 such as seen in FIG. 1. A representative infrastructure of this type comprises an IP switch 102, a set of one or more web server machines 104, a set of one more application server machines 106, a database management system 108, and a set of one or more administration server machines 110. Without meant to be limiting, a representative technology platform that implements the service comprises machines, systems, sub-systems, applications, databases, interfaces and other computing and telecommunications resources. A representative web server machine comprises commodity hardware, an operating system such as Linux, and a web server. A representative application server machine comprises commodity hardware, Linux, and an application server. The database management system may be implemented as a database management package running on Linux. The infrastructure may include a name service, FTP servers, administrative servers, data collection services, management and reporting servers, other backend servers, load balancing appliances, other switches, and the like. Each machine typically comprises sufficient disk and memory, as well as input and output devices. The software environment on each machine includes a Java virtual machine (JVM) if control programs are written in Java. Generally, the web servers handle incoming requests, and they export web pages (or the like) or other content. The application servers manage the basic functions of the service including, without limitation, business logic.

One or more functions of such a technology platform may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

The front-end of the above-described infrastructure is also representative of a conventional network-accessible web site or web service. This site or service provides a software application that executes in a mobile device to provide the in-vehicle "coaching" functionality of this disclosure, as will be described below.

More generally, client (vehicle driver-side) devices access the service provider infrastructure via a network (e.g., the public Internet, a private or dedicated network, or any combination) to provide data, and to retrieve content, including HTML, media players, video content, and other objects. A typical client device is a personal computer, laptop, mobile device, tablet, or the like. A representative mobile device is an Apple iPad® or iPad2, iPad Mini, an Android™-based smartphone or tablet, a Windows®-based smartphone or tablet, or the like. A device of this type typically comprises a CPU (central processing unit), computer memory, such as RAM, and a flash drive. The device software includes an operating system, and generic support applications and utilities.

Figure 2:
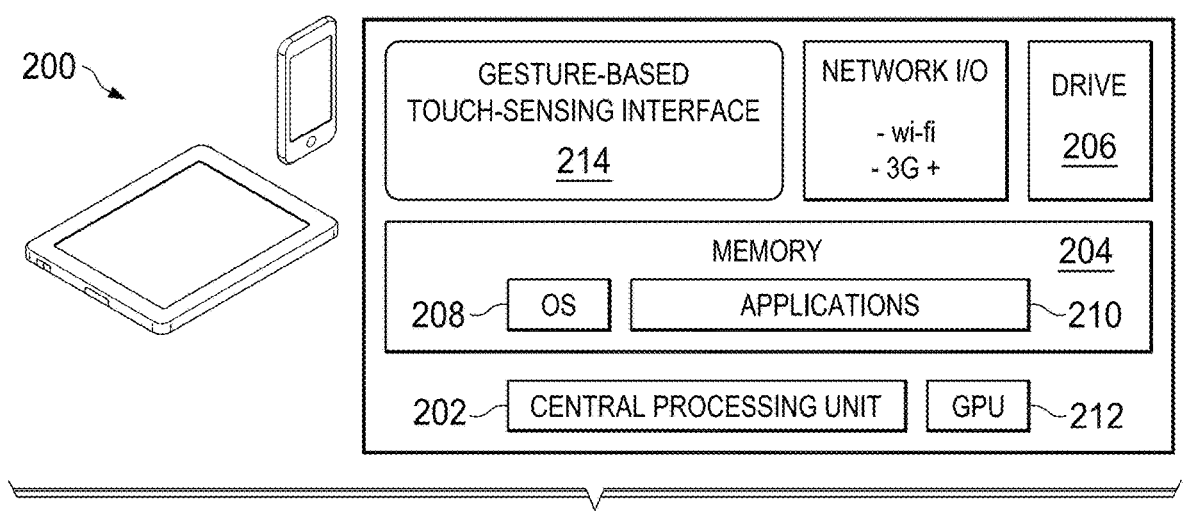
FIG. 2 is a representative client-side (mobile) device that executes an in-vehicle application for teaching, measuring and rewarding a vehicle driver.

A representative mobile device is shown in FIG. 2. The device 200 comprises a CPU (central processing unit) 202, such as any Intel- or AMD-based chip, computer memory 204, such as RAM, and a drive 206. The device software includes an operating system (e.g., Apple iOS, Google® Android™, or the like) 208, and generic support applications and utilities 3210. The device may also include a graphics processing unit (GPU) 212. In particular, the mobile device also includes a touch-sensing device or interface 214 configured to receive input from a user's touch and to send this information to processor 212. The touch-sensing device typically is a touch screen. The touch-sensing device or interface 214 recognizes touches, as well as the position, motion and magnitude of touches on a touch sensitive surface (gestures). In operation, the touch-sensing device detects and reports the touches to the processor 212, which then interpret the touches in accordance with its programming. The mobile device typically also includes other input/output devices include software-based keyboards, cameras, microphones, and the like.

More generally, the mobile device is any wireless client device, e.g., a cellphone, pager, a personal digital assistant (PDA, e.g., with GPRS NIC), a mobile computer with a smartphone client, or the like. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Thus, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices. The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

The client is not limited to a mobile device, as it may be a conventional laptop or other Internet-accessible machine running a web browser or mobile application (app). Content retrieved to the client may be rendered in a browser, within a mobile app, or other rendering engine.

The client may also be a telematics device installed in the vehicle.

The client also may be integrated into existing in-vehicle devices, such as a fuel mileage gauge in-dash.

Driver Measurement and Incentive System for Improving Fuel-Efficiency

With the above-described enabling technologies, the following provides additional background.

In one embodiment, a vehicle driver is provided with a display interface (e.g., a graphical user interface (GUI)) via the smartphone, tablet, PC, or any telematics or in-vehicle device installed in the vehicle. As will be described, the user interface preferably presents a real-time target to follow to maximize fuel economy and safety, achieved by modulating the accelerator pedal appropriately. Preferably, this target is derived via algorithmic techniques (a set of one or more algorithms) that use data from the following one or more input sources: Engine Control Unit (ECU) data including, without limitation, vehicle speed, engine load, engine speed, fuel rate, mass air flow, and the like, third-party supplied data such as temperature, % grade, time of day, and the like, and other (potentially proprietary) data such as driver history, vehicle history, location target, and the like. The one or more algorithms preferably execute in an application running in the mobile device (or other telematics or i-vehicle device). In a preferred embodiment, the application runs on a web-connected mobile device, connected to a motor vehicle's engine control unit (ECU), either wirelessly or via cable (e.g., Ethernet, Firewire, or the like). Using the various data sources described, e.g., data received via the Internet or otherwise (i.e. % grade, driver ID, proprietary data, temperature, and the like), data from the mobile device (i.e. GPS location, time of day, or other data), and data from the ECU (mass air flow, fuel rate, rpm, vehicle speed, or other data), a display is rendered by the device to teach a driver how to move the vehicle in the most efficient and safest manner.

Generalizing, there may be several data sources that may be used to drive the application. These include: first data, which originates in the vehicle itself; second data, which originates externally from the vehicle and represents one or more local (to the vehicle) environmental condition(s) associated with a current operation (real-time, or near real-time) of the vehicle; and third data that is historical in nature and that associates one or more of the following: this particular driver, this particular vehicle, this particular job, and this particular route. The first data is typically derived from the vehicle ECU system but in general may be any data that originates in the vehicle according to one or more of the following industry standards: SAE (Society of Automotive Engineers International) J1939, SAE J1708, SAE J1587, and SAE J1979. The second data typically is one of: time, temperature, percent grade, wind conditions, weather, altitude (from GPS), hill detection, forward looks at the route grade from topological maps, and the like. The third data typically is specific to the driver, vehicle, job and/or route for which the calculation is being generated. The third data may not always be available; when third data is available, it is often useful to seed the calculations, as will be described.

In this embodiment, fuel rate is approximated as linearly increasing as the vehicle speed increases with all other factors constant. To generate this line of fuel rates versus speeds, events that fall around an acceleration window (typically zero) are collected and used to determine a fitted first order curve. These collected events can be used to generate an assumption of a fuel rate at a predetermined higher speed (typically 65 miles/hour or its km/hour equivalent). Using one or more of the below-described algorithms, this fuel rate is then used to set a fuel rate limit over a full range of vehicle speeds. As more data is collected, this fuel rate is further refined and updated. Initially, this fuel rate is seeded through remote/local database lookups, and it is refined as more data is collected and confidence of the collected data is high (or at or above a configurable threshold). When external data sources are available, the fuel rate is permitted either to rise or fall as a function, for example, of one or more of: grade %, wind speed and direction, vehicle load, driver habits, and typical route speeds and fuel rates for vehicles of the same type.

Preferably, one or more algorithms as described below operate to a target (fuel rate <diesel> or air mass <spark ignition>) for the driver to follow which varies, for example, according to the difficulty of the mission of the vehicle. Furthermore, preferably a score is presented to the driver such that performance can be measured. In another aspect, an indicator is provided in the form of a display pointer relative to other display indicia that guide or coach the driver regarding the operating characteristics (e.g., an amount of throttle) to apply as the vehicle moves along the route. When utilized, the application improves fuel mileage, reduces safety incidents, and helps fleets retain their best drivers, e.g., by facilitating incentive programs. For example, using the application, the driver is scored and earns or loses "points" based upon their performance against the target. On a periodic basis, a score is used to offer the driver an incentive such as a pre-paid credit card.

Figure 3:
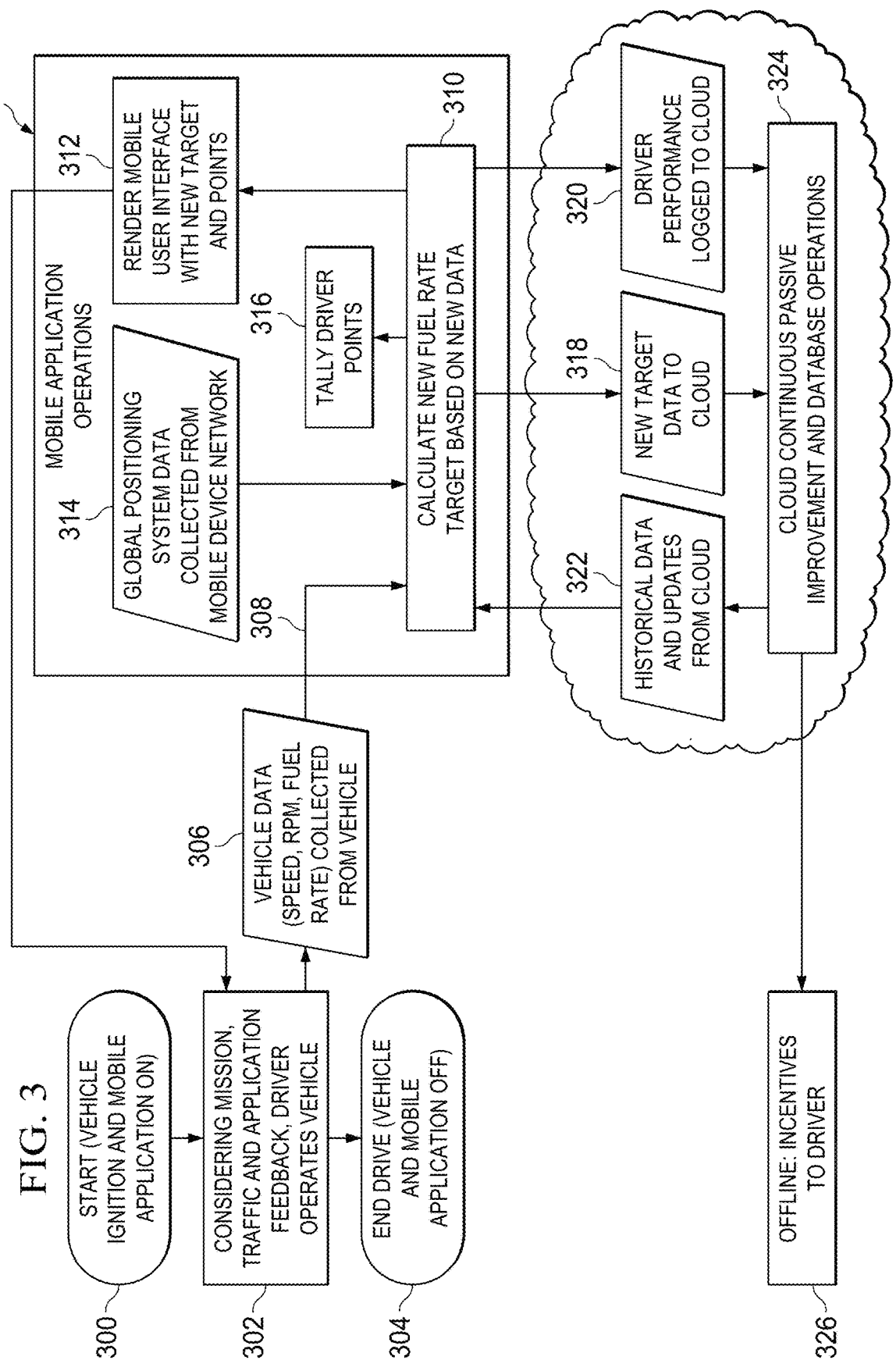
FIG. 3 is a process flow of a driver measurement and incentive process for improving vehicle fuel-efficiency.

FIG. 3 illustrates a driver performance monitoring technique. Typically, there are a set of mobile device-specific operations, and the mobile device may interface to a service provider infrastructure as necessary. As noted above, the display interface preferably is generated by a software application that provides the described functionality (on the driver side), typically using local display resources in the mobile device (depending on the type of device used). The application may be provided by the service provider, by a third party (e.g., an app store), or it may be integrated (or native to, as original-equipment) with an in-vehicle device.

The following describes the basic operating scenario. Typically, the vehicle is a truck driven by an operator (a driver). This is not a limitation, however, as the techniques herein may be implemented in any type of vehicle (including passenger automobiles, boats, aircraft or other machines) whose fuel efficiency may be monitored and in which visual feedback may be provided to an operator of the vehicle during operation. The vehicle may be being driven remotely by an operator, or the technique may be implemented in a "simulated" driving environment (such as in conjunction with a simulator or training device or system). The techniques herein may also be implemented as a training system or tool within a machine or system, e.g., using test or simulated data for the various inputs, to train vehicle operators for when they get out in real-world situations.

The application described herein is sometimes referred to as a "coach" or "coaching" application, as it is used to train the operator to use the vehicle pedal more efficiently, thereby improving overall vehicle fuel economy.

In the typical in-vehicle operating scenario, and with reference to FIG. 3, the operator starts the vehicle (at step 300), which activates the coach application. The vehicle is then operated (step 302) with the assistance of the coaching application (as will be described), which application considers the driving mission and operating conditions, traffic conditions and other data, and provides visual and/or aural feedback to the driver. The vehicle is operated under load on a road. When the drive ends, the vehicle is turned off, and the application is closed (step 304). While in motion, various types of vehicle data such as speed, engine RPM, fuel rate, and the like, are collected (step 306). As noted above, typically this is data from the vehicle electronic unit (ECU) and includes vehicle speed, engine speed, engine load, percent torque, fuel rate, air mass, and the like. This data is pushed to the on-board device (e.g., via wireless or cable) (at step 308). The coach application 305 executes as software (a set of computer program instructions) in the mobile device and performs a number of high level operations as depicted. Its primary functions are calculating a target fuel rate based on various data inputs (at step 310), and using the output of this calculation to control rendering of a new target value on a display interface (at step 312). The target fuel rate (or, in the alternative, air mass) calculation preferably also uses GPS data collected from the mobile device network (at step 314). Typically, data from the device (e.g., GPS location) is pushed to the application wirelessly. The output of the calculation may also be used to generate "points" for a driver who complies with the target fuel rate (at step 316).

The service provider, which may be cloud-based as shown, provides and receives various data, and it provides one or more services. Thus, for example, typically the data from the ECU, as well as the output(s) generated by step 310, are provided to the service provider database (e.g., via mobile data connection) (at step 318). Driver performance driver data captured by the coach application is logged to the service provider (at step 320). Historical data and updates as needed are delivered to the coach application (at step 322). For example, the service provider database typically pushes various types of data, e.g., driver history, driver handicap, location difficulty, vehicle handicap, % grade, time of day, traffic, temperature, and the like, to the application. The service provider preferably also executes a cloud-based driver management process and its associated database operations (at 324), which provides driver incentives or other feedback (at step 326).

In one embodiment, the calculation performed at step 310 works generally as follows. In this example scenario, the calculation is executed on-board the mobile device (and, in particular, the coach application executing thereon) runs a routine against all (or some subset of) inputs to determine what the target (e.g., fuel rate, air mass, and the like) should be for this particular driver, this route, this load, and this vehicle. In the alternative, the calculation (or some portion of it) may be executed in the service provider environment, or elsewhere. The device then receives the target value (or values). Using a display interface, the target value is then rendered, preferably in a graphical manner.

Figure 4:
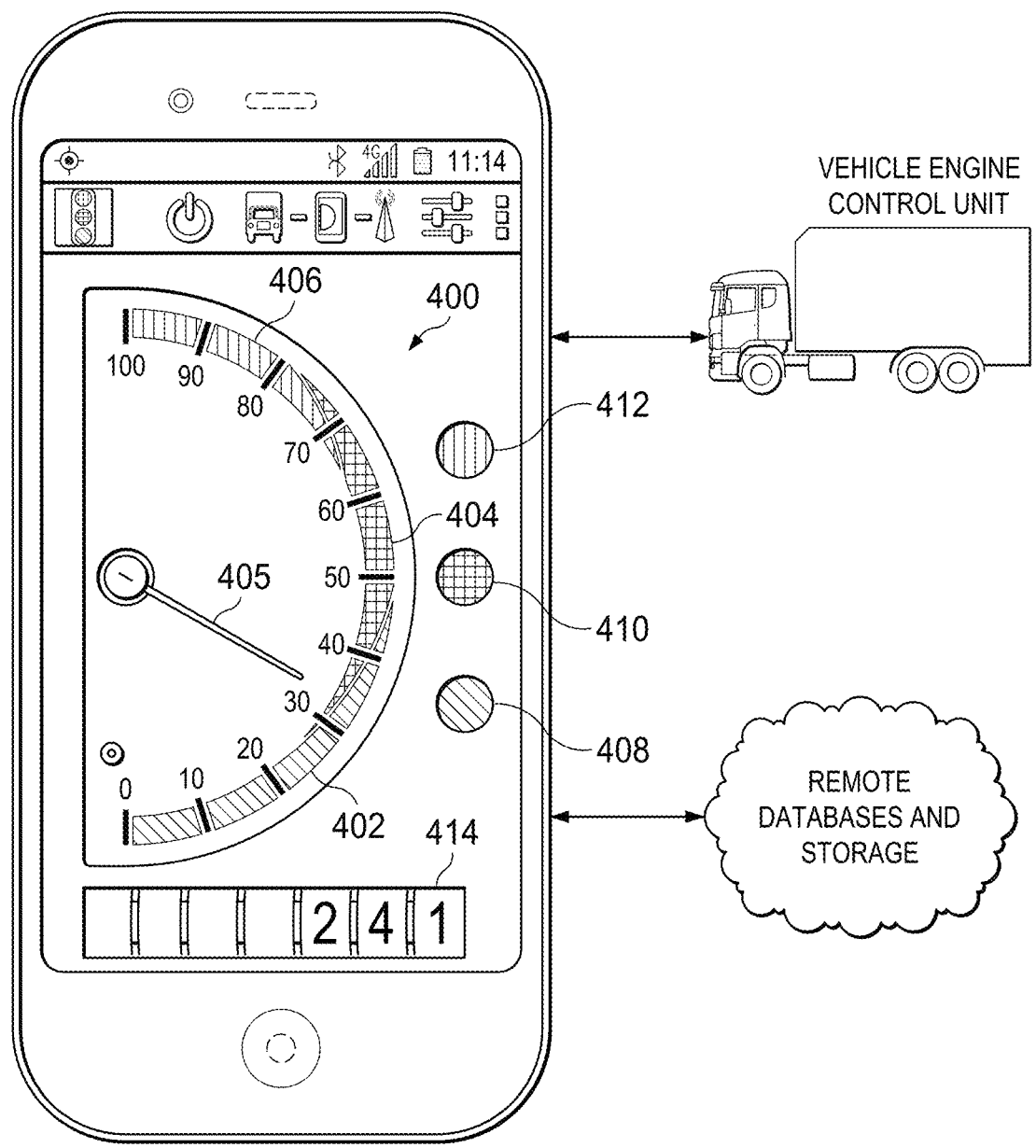
FIG. 4 illustrates a representative client-side user interface (UI) on a mobile device display.

FIG. 4 illustrates a representative display interface 400 for this purpose. The interface may be generated on the mobile device by the coach application, or the outputs from that application may interface to another display application. The display interface 400 is illustrated as a gauge (to be consistent to a standard in-vehicle display format) that includes a set of spaced values as shown. Preferably, the gauge is semi-circular and includes three (3) or more zones, such as green 402, yellow 404 and red 406. A pointer 405 is driver around the gauge based on the results of the calculation (step 310 in FIG. 3). The display preferably is updated continuously, periodically (e.g., every few seconds), or in some combination thereof. There may be particular driving conditions during which the operation of the display is suspended. Additional operator feedback is provided by a set of lights 408, 410 and 412 (e.g., simulated LEDs), which illuminate green, yellow and red, respectively. The interface also preferably includes a running point meter 414, whose value increases provided the driver maintains the pointer within some acceptable range.

Thus, data regarding a specific vehicle class (type) is collected and fuel rate versus vehicle speed evaluated (using some empirical data analysis technique). If other data (e.g., information about the particular driver, specific information about the actual vehicle itself, or the like) is available, that other data may be evaluated as well during this process. During this evaluation, preferably zero acceleration events are filtered out. The zero acceleration events correspond to events when the vehicle is not accelerating or decelerating but, rather, travels at constant speed. While there may be lots of small differences over short periods of time, over a large chunk of data these differences tend to average out and the resulting data points represent a function (in effect, "how much fuel does it take to keep the vehicle at a steady speed"). These zero acceleration fuel rate versus vehicle speed data points form a line. The line is described by $y=mx+b$, where $x=$speed, and $y=$fuel rate. This line represents the amount of fuel needed to keep this type of vehicle at speed assuming ideal conditions (no acceleration, driving on a flat and smooth surface, with no wind, a constant load, etc.). This becomes a "baseline" for the vehicle class. Ideally, any fuel rate below this line for a given speed represents "green" on the display interface gauge. Any fuel rate above this line for a given speed represents "yellow and red" on the gauge. If this optimal rate is held, the resulting curve represents the "green/yellow" transition point for the gauge. Preferably, the application gives drivers a little more room at lower speeds than what is represented on the curve. As an example of this approach, a speed point (e.g., 65 MPH) may be selected and the fuel rate capped with the corresponding fuel rate from the baseline. If the driver uses no more than this fuel rate, the vehicle should be able to achieve a gradual acceleration to that speed and then be able to hold it. If more fuel than that is used, the pointer enters the yellow or red zones. Preferably, the calculations may adjust dynamically for events or occurrences (e.g., hills, head winds, or the like) beyond the driver's control. As additional statistically-relevant fuel rate and speed data points (around zero acceleration) are available, the baseline may be recalculated. Typically, it will be desirable to adjust the baseline based on external data (e.g., hill detection, altitude from GPS, forward looks at the route grade from topological maps) and, if available and statistically-significant, historical information (e.g., about the driver, the vehicle, the driver's past history in the vehicle for the particular route, and so forth).

The display pointer in the gauge may be scaled, e.g., by adjusting a weight to be applied to the difference of the actual fuel rate and the recommended/ideal fuel rate and that comparison to a position of the pointer for feedback to the operator. The display pointer may also be scaled to provide different degrees of difficulty based on a proficiency of the driver; thus, as the driver becomes more proficient, it may be desirable to scale the pointer to increase the difficulty (of maintaining the pointer in the green zone) so that the driver's skills may be further improved using the coaching technique.

The display interface preferably is rendered by the coach application. In an alternative, the gauge, lights and point meter may be virtual (e.g., projected via a heads-up display, Google Glasses™, or the like.

The visual cues may be supplemented (or even replaced) with audible cues, tactile (haptic-based) cues, or some combination(s) thereof. Thus, for example, the mobile device may buzz when the pointer moves out of the green zone, or a signal may be sent to a haptic device embedded in the steering wheel, or the driver's seat, to provide a vibration. Of course, these are merely examples.

The display interface may use other display formats and constructs (e.g., linear scales, numerical read-outs, and the like) in lieu of (or to supplement) the gauge.

The display may be augmented to include other information that may be used in the target calculation.

The application may be configured to present statistics or other reports to the driver upon given occurrences, such as at key-off. Thus, for example, the application may be configured to provide a driver summary and a driver "leaderboard" so that the driver can determine his or her current status with respect to other drivers.

Figure 5:
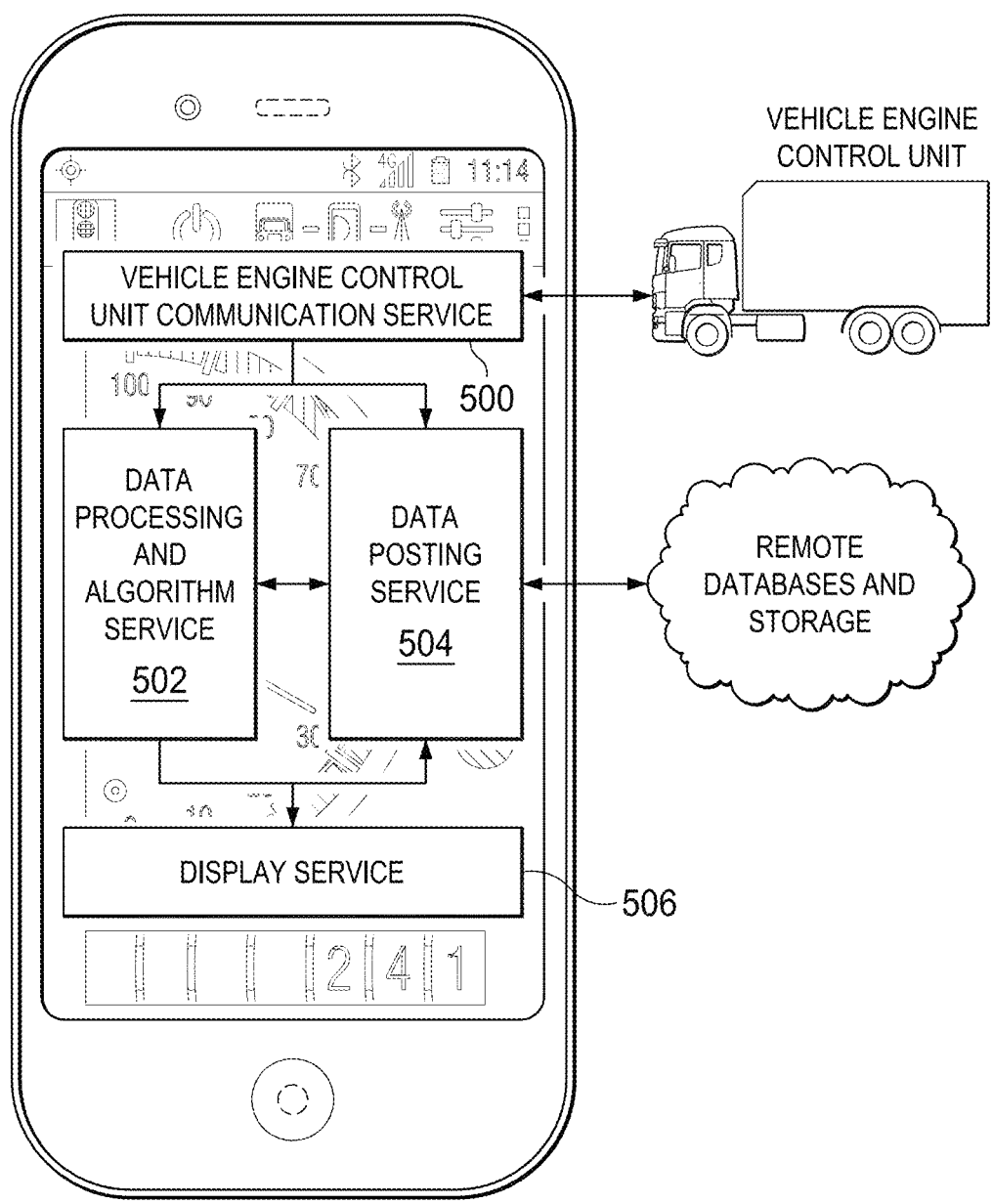
FIG. 5 illustrates a set of software-based services that execute in a coaching application of this disclosure.

FIG. 5 illustrates a set of software-based services that execute on the mobile device and comprise the coach application. These include a vehicle ECU communication service 500, a data processing and algorithm service 502, a data posting service 504, and a display service 506. ECU communication service provides the vehicle data for the calculation. The data processing and algorithm service 502 performs the calculations to generate the target data, using data supplied by the ECU communication service 500, as well as data provided from the remote databases and storage and forwarded through the data posting service 504. Data posting service 504 also collects driver performance data and posts it to the service provider databases. The display service 506 takes the outputs generated by the service 502 and uses them to drive the displays, in the manner described.

In operation, the target is calculated (based on the inputs), driver performance against the target is measured, points are accumulated, and scoring presented. The service database logs performance data by the vehicle, by the operator, and by location. Preferably, an incentive program is offered to the driver based upon achievement of a minimum score, e.g., as established by a fleet manager.

To use the system in the vehicle, the driver turns on the mobile device and starts the vehicle. A wireless link is established. The driver preferably drives so as to keep the needle in the "green" zone. Points are then awarded, e.g., based on miles driven in the green zone. Miles driven in the yellow zone may be deemed neutral. However, any excursions into the "red" zone preferably lock-out the point-logging for a given time period (e.g., 10 seconds). As indicated, preferably the score is presented as a percentage, calculated as a number of points per number of miles. The score at the end of a measurement period may then result in an incentive bonus based on the fleet and driver targets. The application is turned off as needed or desired.

The subject matter described above thus provides for a software application intended to run on a network-connected mobile device, and connected to receive data from a motor vehicle's engine control unit (ECU). Using the described data sources (or some subset of them), a target value is generated and an indication is rendered by the device to teach a driver how to move the vehicle in a most-efficient manner. In operation, a calculation executed by the application creates a target (fuel rate <diesel> or air mass <spark ignition>) for the driver to follow, and that target preferably varies according to the difficulty of the mission of the vehicle. Furthermore, a score is presented to the driver such that performance can be measured. Financial or other rewards may be offered to the driver periodically on the basis of these scores. Any type of driver incentive program may be used.

The following provides additional details regarding the calculations that are used to drive the display interface. According to this disclosure, a set of algorithms are used for this purpose. As noted above, an underlying assumption is that the fuel rate to maintain a vehicle at a constant speed, with all other factors (grade %, wind speed, load) constant, should linearly increase as speed increases. Each algorithm typically, without limitation, takes in information from the following sources: vehicle Engine Control Unit (ECU) (namely, one or more of: vehicle speed, fuel rate, engine speed, transmission gear value, brake switch, vehicle identification, and component information), the mobile device itself (e.g., GPS Location, GPS Altitude, accelerometer values, and time/date), and external data sources (e.g., temperature, grade %, vehicle information, driver history, and prior fuel limits). As noted above, the ECU data is gathered using communication methods as defined in the industry standard documents which include, but is not limited to: SAE (Society of Automotive Engineers International) J1939, SAE J1708, SAE J1587, and SAE J1979. Preferably, outputs returned from each algorithm are an instantaneous feedback, typically in the form of a numerical value from 0 to 100% (needle position of the pointer 405) that will reflect a driver's ability to maintain his or her fuel rate (an amount of fuel used per unit time) in an acceptable range determined by the algorithm's fuel rate limit. Along with this feedback, the driver preferably also receives a number of points based upon distance travelled and needle position reference previously. These points are then used as part of the incentive program.

Preferably, there are four (4) distinct algorithms that may be used in various ways, as will be explained. These algorithms are referred to herein for convenience as SB, P, G and B. Generally, some combination of the algorithms is used to develop a fuel rate limit based upon the vehicle, driver, payload and driving environment.

Initial (or default) fuel rate limits, prior to acquiring an adequate data set, may be derived using a local and remote database lookup based upon prior vehicle history using vehicle ECU information including VIN, serial number, model, make, and the like. If this information is unavailable or has not been delivered (by the Vehicle ECU) to the mobile device, logged-in fleet or logged-in driver information may be used to generate fuel rate limits. This is considered the initial seeding, whereby the fuel limit is set on those criteria and then further refined using the algorithms listed below. Some "softening" of the fuel limit may be factored into each limit based upon changing short term environmental conditions, e.g. headwind, crosswind, grade changes. During these events, the application typically allows the driver to maintain his or her current speed or maintain current fuel rate, but typically discourages the driver to accelerate during the events. Of course, the application may always make exceptions in the event of hazardous conditions.

The SB algorithm generates a first order polynomial fitted curve based upon fuel rate and vehicle speed based on acceleration value and transmission gear value. This curve is then used to determine the maximum allowable fuel rate at a given speed. The fuel rate limit can be adjusted based upon a difficulty set for the driver. This difficulty adjusts the zero speed intercept of the fuel limit curve. In a preferred embodiment, this algorithm thus takes in driver, company, ECU vehicle information (e.g., VIN, make, and model) to determine a fuel limit for the driver based upon a database query. It then takes in vehicle speed and fuel rate to generate a needle position for the display gauge, and to collect driver points earned, as well as possible driver points.

The P algorithm determines the maximum allowable acceleration that will not increase trip duration, e.g., based upon the EPA's Federal Test Procedures (FTP) Drive Cycle. This calculation leads to an allowable acceleration value over the speed range of the vehicle. Fuel rate limits are then developed by vehicle speed, fuel rate, engine speed and transmission gear value, preferably to generate a simple regression of the vehicle speed and fuel rate. These limits are then used to generate the three (3) distinct driver feedback zones of fuel rate (green, yellow and red). In this algorithm, the fuel rate limits are allowed to change based upon the statistical deviation from previously-collected data to the current collected data. In a preferred embodiment, this algorithm takes in time, vehicle speed, and fuel consumption to determine a fuel limit based upon the acceleration of the vehicle. It then outputs a needle position for the display gauge, and to collect driver points earned, as well as possible driver points.

The G algorithm stores instantaneous events containing vehicle speed, fuel rate and engine speed to finite sized bins based upon their acceleration and transmission gear value. When a statistically-relevant number of bins are filled, a (least-squares) linear regression is developed using the vehicle speed and fuel rate. This regression is then used to determine the top speed fuel rate, which is used to generate a fuel rate limit. Preferably, these fuel rate limits are continuously updated based upon incoming data and drop out of older, less relevant data samples. In a preferred embodiment, this algorithm takes takes in time, vehicle speed, and fuel consumption to determine a fuel limit based upon acceleration of the vehicle. It then outputs a needle position for the display gauge, and to collect driver points earned, as well as possible driver points.

The B algorithm calculates Δspeed/Δfuel rate values based upon the instantaneous events of the vehicle with reference to the current acceleration and transmission gear value. The Δspeed/Δfuel rate value preferably is then cross-referenced to a look up table, either locally or remotely, that stores fuel rate limit curves based upon empirical data analysis of optimum fuel rates for similarly derived Δspeed/Δfuel rate values. During a typical drive, this number typically updates based upon varying environmental conditions, e.g. change in payload, grade change, and wind direction, which will then reference the lookup table to acquire a more appropriate fuel rate limit. In a preferred embodiment, this algorithm takes in time, vehicle speed, and fuel consumption to determine a slope of fuel consumption and vehicle speed, which is then used to determine a fuel limit based upon a database query. It then outputs a needle position for the display gauge, and to collect driver points earned, as well as possible driver points.

A combination of the described algorithms, or any of them individually, may be used to define the instantaneous fuel limit of the vehicle.

Figure 6:
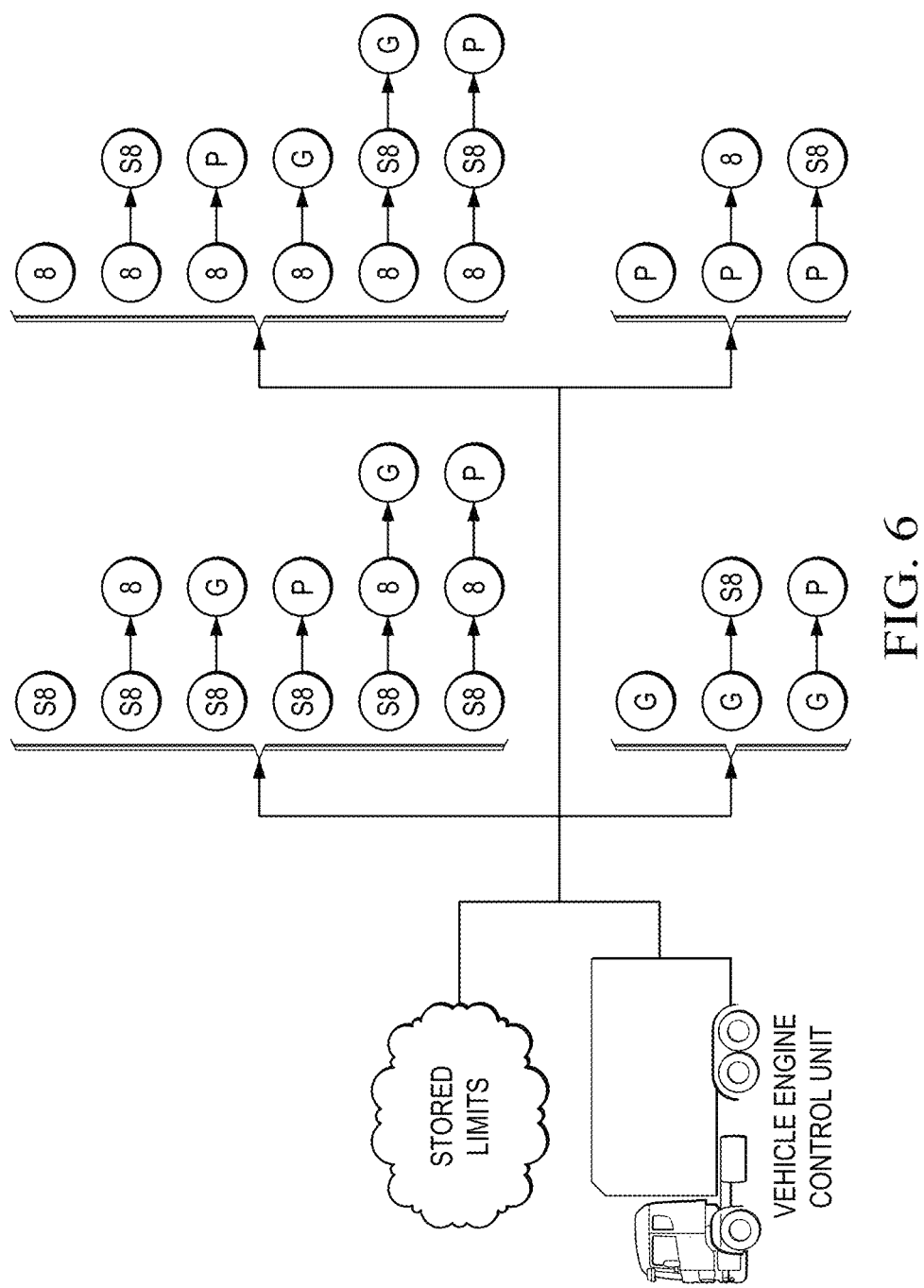
FIG. 6 illustrates how various algorithms may be used to calculate target variables (e.g., fuel rate, air mass, or the like)

A combination of these algorithms preferably is used to generate the optimum fuel rate limit for the vehicle at any given time. FIG. 6 illustrates representative permutations of the algorithms. As illustrated, in a first embodiment, as represented at 602, algorithm SB is executed initially individually, or more typically, in association with one or more of the other algorithms as shown. In a second embodiment, as represented at 604, algorithm G is executed initially individually, or in association with the SB or P algorithms. A third embodiment, as represented at 606, involves algorithm B being executed initially, either individually or followed by one or more of the algorithms shown. A fourth embodiment, as represented at 606, involves executing algorithm P initially, either by itself or in association with one of the B and SB algorithms. Thus, as indicated, each of the algorithms may be executed either alone or in some combination. Regardless of which algorithm(s) are used, typically the initial seedings (and thereafter updates) come from the vehicle ECU or from data received to the application from remote data sources, as has been described. The one or more algorithms are executed to further and continuously refine the target (fuel rate or air mass) limit that then drives the pointer and other display elements.

By deploying the coach application, vehicle fleets radically improve operating costs by lowering overall fuel consumption, reducing insurance premiums, and improving driver retention. The coach application easily integrates with existing smartphone, tablet, and telematics solutions. The described approach is readily implemented so little or no additional workflow is required for a fleet to get started and begin saving.

The coach application provides an in-vehicle cab, real-time user display of fuel mileage performance, thereby enabling immediate coaching on actual fuel used versus the fuel needed to get the job done. If the driver follows the display, he or she saves fuel. The coach application automatically measures, detects and calculates, in real-time or substantially real-time, an optimal setting for the vehicle throttle that adapts to the particular driving job, regardless of vehicle class or load. The display is simple to use and provides a common and well-known metaphor that does not distract the driver. By integrating the application into a conventional smartphone or table, hardware costs for the solution are minimal, and the approach is easy to integrate. The cloud-based data services model enables fleet operators and others who use the system easy and secure access to data, reports, leader-boards, or the like and improves analysis, tracking and reporting.

The approach enables users to save fuel. Visual (and, optionally, audio and/or haptic) cues provide real-time indicators that coach toward ideal fuel performance regardless of truck class or load. The solution engages and centers driver attention on the things that translate to superior safety performance. A by-product is fewer accidents and lower overall operating costs. With the described approach, both drivers and fleet managers have detailed performance data at their fingertips. The data drives win-win incentive plans and reward programs that help improve driver retention.

The described technique (using the one or more algorithms) adapts to varying roads, loads and other factors that are out of the drivers' control to set an efficient target for the driver to follow. Each trip is scored and logged to feed a monthly or quarterly performance-based incentive program.

Driver Performance Measurement Based on Geohash-Based Path Analysis

The following describes a variant embodiment.

According to another aspect of this disclosure, driving performance comparisons (by and between or among vehicles, drivers, time-of-day, or the like) is enabled by enabling monitored/collected performance data to be overlaid (or otherwise) combined with a path analysis. As used herein, a path refers to a travel path taken by a vehicle. Travel path analysis herein preferably is enabled using geohashes. Geohash is a known geocoding system that encodes a geographic location into a short string of letters and digits. In particular, the geocoding system is a hierarchical spatial data structure that subdivides space into buckets of grid shape. Geohashes provide arbitrary precision; in one type of common geohash (MGRS, as described below), as characters are gradually removed from the end of the code to reduce its size, precision is gradually reduced. As a consequence of the gradual precision degradation, nearby places will often (but not always) present similar prefixes. The longer a shared prefix is, the closer the two places are. With a geohashing API or service (see, http://geohash.org), geographic coordinates can be converted into short URLs that uniquely identify positions on the globe. To obtain the geohash, an address to be geocoded, or latitude and longitude coordinates, are provided (or input to the API or site page), and a geohash is returned. Besides showing the latitude and longitude corresponding to the given geohash, navigating to a geohash also preferably returns an embedded map; the API/service may also provide a GPX file, or transfer the waypoint directly to one or more Global Positioning System (GPS) receivers. GPX (GPS Exchange Format) is an XML schema designed as a common GPS data format for software applications.

Generalizing, a geohash is a location→string mapping. As will be described, by using geohashing, the system of this disclosure has the ability to quantize space from a continuous latitude/longitude-basis to one wherein a single geohash string represents a larger area.

According to an embodiment, it is assumed that the above-described performance measuring/monitoring is carried out in-vehicle for two or more users, and that each such tracking also captures the vehicle route, preferably on a continuous basis as the vehicle travels over the route. The continuous travel data for the vehicle is then converted into a finite set of geohashes, e.g., a sequence of MGRS (Military Grade Reference System) grids. MGRS is a geocoordinate standard for locating points on Earth, and it is derived from the Universal Transverse Mercator (UTM) grid system and the Universal Polar Stereographic (UPS) grid system, but uses a different labeling convention. An MGRS grid reference is a point reference system. The first part of an MGRS coordinate is the grid-zone designation. In particular, the 6° wide UTM zones, numbered 1-60, are intersected by latitude bands that are normally 8° high, lettered C-X (omitting I and O). The northmost latitude band, X, is 12° high. In this point reference system, the intersection of a UTM zone and a latitude band is (normally) a 6°×8° polygon called a grid zone, whose designation in MGRS is formed by the zone number (one or two digits—the number for zones 1 to 9 is just a single digit, followed by the latitude band letter (uppercase).

The techniques herein are not limited to MGRS-based grid systems; an alternative is the National Grid system. In still another alternative, a customized geohash may be generated, e.g., by taking given information from a latitude and longitude measure and applying some function, e.g., concatenation. Taking the example of the Prudential Tower in Boston (located at latitude 42.347425, longitude −71.082728), a representative geohash (based on an encoding scheme using up to the first three decimal values and the concatenation function) would have the value "42347-71082." Any suitable encoding scheme and function may be used to create a custom geohash that associates the location to the string mapping.

After the continuous travel path for the vehicle is converted to a finite set of geohashes (e.g., the sequence of MGRS grids), the driver or vehicle metrics captured (as described above) are assigned to the path, preferably on an individual geohash basis. For example, and without limitation, a particular geohash along the route (path) being analyzed then has associated with a data set, e.g., fuel used, average speed, cruise control use, and the like). Once these data set(s) are generated with respect to the path for the particular driver and/or vehicle, the system saves (stores) the information in a data store having an associated database. The database is accessed via a database management system that enables the data to be queried (searched), with relevant data then returned. According to this disclosure, data sets from two or more drivers or vehicles are captured, associated with geohashes, and the associated data stored for analysis. These geohash-indexed data sets are saved for querying, comparison and analysis.

Figure 7:
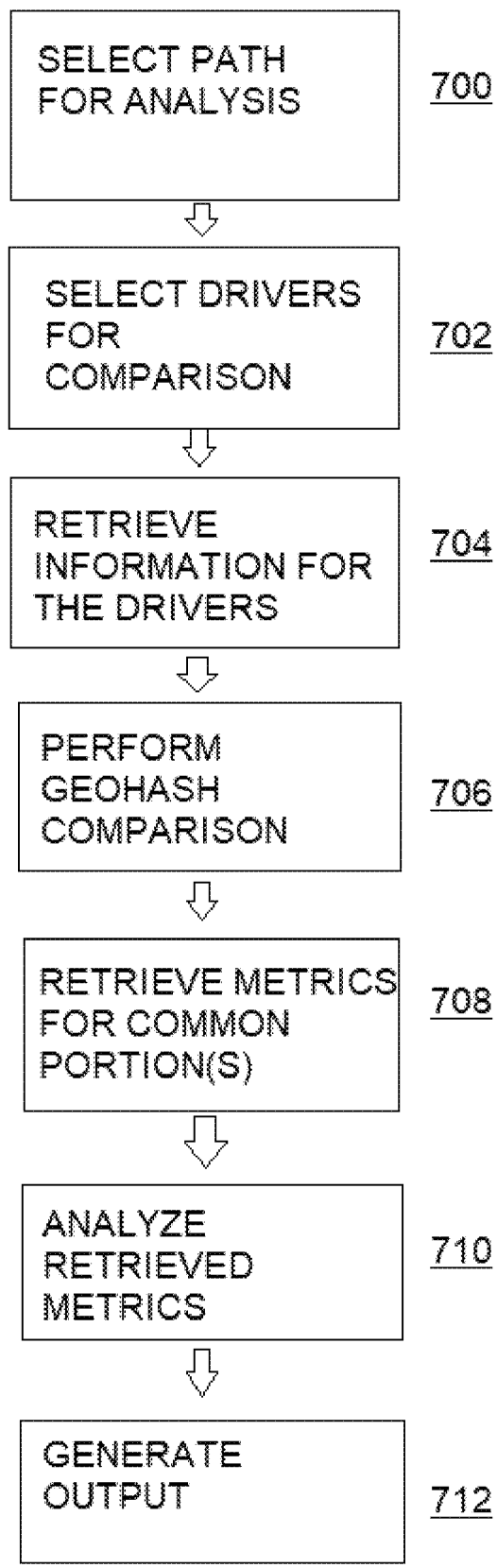
FIG. 7 depicts a process flow of one embodiment of this disclosure, which provides a driver performance measurement system using geohash-based path analysis.

In one embodiment, and with reference to FIG. 7, at step 700, a particular path is selected for analysis. In this example, it is assumed that the path is all or a portion of a vehicle route of interest. At step 702, two or more drivers are selected for comparison. At step 704, the system retrieves the stored information for the drivers. At step 706, a comparison is performed for the relevant geohash data to find one or more portions along the route of interest that are the same. For each common portion identified via the geohash data, the routine continues at step 708 to retrieve the metrics gathered for each driver with respect to the route. The system may filter the data sets if the information in the sets is not identical. At step 710, the retrieved metrics are then compared (analyzed). At step 712, an output of the analysis is provided. The output may include a visualization, a notification, an alert, or the like, depending on the information required or desired. In this manner, an interested entity (e.g., an employer) can perform specific driver or vehicle performance comparisons.

Figure 8:
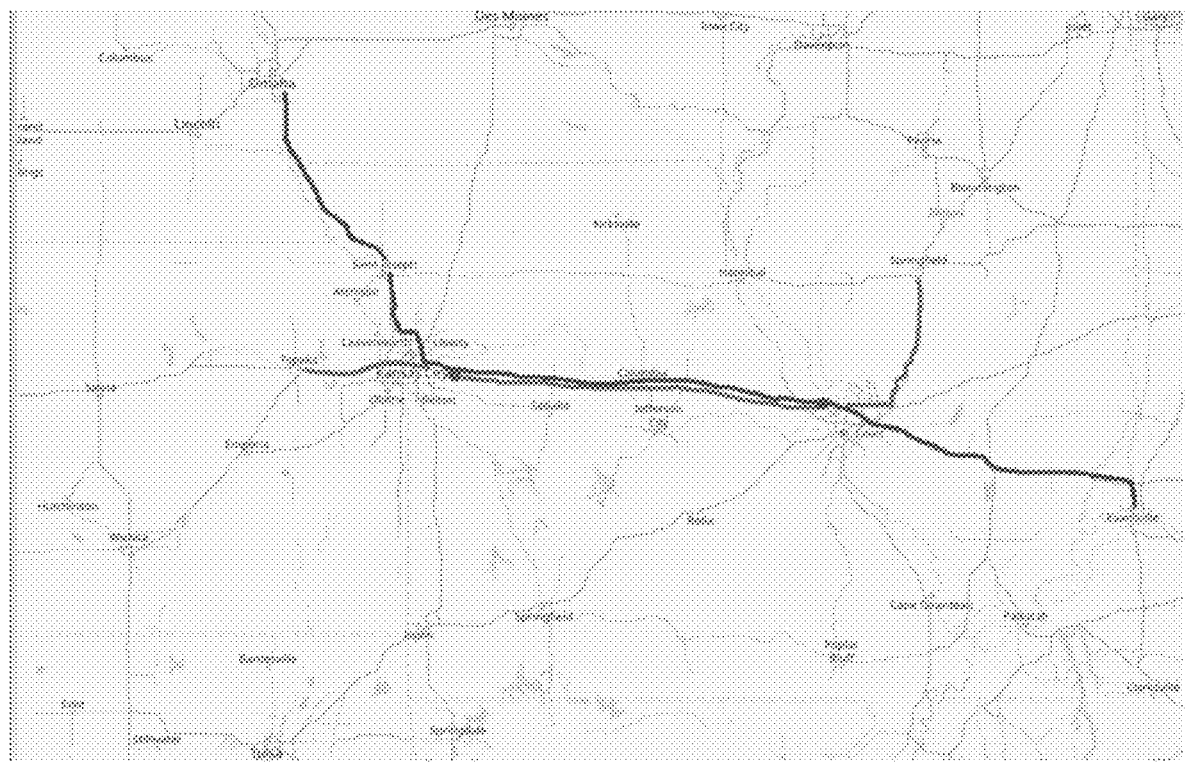
FIG. 8 depicts a map showing routes taken by first and second drivers and that are processed using MGRS-based analysis according to this disclosure.

For example, assume there are two (2) trucks, one traveling from Omaha through Kansas City and St. Louis, ending at Evansville. The other truck is traveling from Topeka through Kansas City and St. Louis, ending at Springfield. Using MGRS-based grids, for example, FIG. 8 depicts these routes, with the first route being depicted in solid line, and the second route being depicted in a dashed line. The solid line truck then has MGRS grids (at a one (1) km size), a path: 15TTF6253 (outbound Omaha), 15TTF6252, 15TTF6251, ... 15SVD0020 (outbound Kansas City), ... 15SXC9798 (inbound St. Louis), ... 15SYC5777 (outbound St. Louis towards Evansville), ... 15SDH4316 (inbound Evansville); the dashed line truck, however, is determined to have a path defined by MGRS grids: 15STD7623 (outboard Topeka), 15STD7723, 15STD7823 ... 15SVD0020 (outboard Kansas City), ... 15SXC9798 (inbound St. Louis), ... 16SBJ5204 (outbound St. Louis towards Springfield), ... 16SBJ7294 (inbound Springfield). Based on a comparison of these geohash data sets (step 706), the following portions are identified as common: 15SVD0020 (outbound Kansas City), 15SXC9798 (inbound St. Louis). Each of these two grids (or other geohash) has performance metrics associated with it for the vehicles/drivers in question. A summation or other computation over the overlapping geohash sequence provides the desired comparative analysis.

Preferably, and based on the computation over the overlapping geohash sequence (or, generalizing, based on some other geohash-based analysis), the system outputs "control" information in the form of signaling that is then delivered (e.g., over-the-air) back to a vehicle and used therein to control an actual in-vehicle system (electronic, electromechanical, etc.) A representative in-vehicle system is a vehicle throttle, a gear system that controls gear selection, a braking system, etc., although these are not limitations, as the particular in-vehicle system that is augmented to respond to control signaling of this type (generated by the platform) may vary depending on the application and the nature of the feedback that is returned back to the vehicle.

The data set(s) described above and the results of applying computations to the performance metrics and their associated geohashing data may be analyzed using a web-based UI, programmatically via an API, or otherwise.

Path analytics as described herein do not require data be collected from actual vehicles operating over the relevant paths. In an alternative embodiment, the data may be provided to (i.e., received at) the analytics system from a third party data source (e.g., Waze®). The third party data source, in turn, may collect such information in any manner including, without limitation, crowdsourcing.

As a further variant, the data collected need not be based entirely on movement of a vehicle. Thus, one or more performance metrics may also be collected (obtained) with respect to a vehicle-at-rest (idling).

The performance metrics data provided to the analysis system and used in accordance with the techniques herein may be simulated data (i.e., based on a simulation of vehicle activity). Thus, in this embodiment, the data analytics are carried out with respect to a data set of performance metrics derived from simulated vehicle movement/activity. The output of the simulation may then be "returned" to the simulated vehicle in the form of a control signal (as described above in the real-world case), with the simulation then augmented to account for inclusion of the control signal.

The technique herein, namely, receiving performance metrics (real, simulated, crowdsourced, etc.), associating the metrics with buckets of geospatial data, and then using that data for comparative analysis, may also create a computational model. A representative model is a machine learning (ML) model, that can then be used for training and other control purposes, as previously described.

Performance metrics (whether real, simulated, sourced from configured vehicles, crowdsourced, etc.) may be associated with buckets of geospatial data and still further constrained by other factors, e.g., time, time-of-day, vehicle speed, etc., and combinations thereof. In this manner, the control signaling generated by applying computation analysis to such data sets may be even more finely-grained.

The notion of "performance" with respect to "performance metrics" is not intended to be limiting to actual driving performance data, as previously noted. Performance as used herein relates to any type of activity that may be captured with respect to vehicle systems or operation, whether real or simulated.

The techniques herein are not limited to vehicles that are internal combustion engine-based vehicles. The approach of capturing/receiving performance (activity) metrics, associating that data with bucket-based geospatial data, performing analytics on that bucketized data, and then using the results for in-vehicle control purposes, etc., may also apply to hybrid vehicles and electric vehicles.

The activity data received with respect to a set of vehicles may be model-specific, thereby enabling the system to perform analytics and provide model-specific control signaling.

As noted above, the techniques herein do not require on obtaining performance metrics (or, more generally, activity data) from in-vehicle based applications (e.g., the Linke-Drive PedalCoach), although this is a useful source for that data. Rather, the techniques herein typically are implemented as back-end operations that receive the performance measurements (whether actual or simulated, etc.). In the usual scenario, computing processes running in the back-end (e.g., cloud-based) computing system receives that information and establishes performance measurement thresholds. Using the techniques herein and, in particular, by applying computations over bucket-based geospatial data, much more useful output data is obtained, and these computations are carried out more efficiently (computational-wise, and storage-wise) given that the data sets are in effect compressed by being encoded according to the bucket-based approach. The back-end server can then compute one or more control parameters for a given route within a given bucket, and such control information is then returned back to the vehicle for real-time or after-the-fact (learned) control. The server calculations result in performance measurement target values that are known to be "good" for the given location, time, time-of-day, speed, vehicle model, etc. In one embodiment, the control signaling is sent back to an application in a mobile device carried in the vehicle, or even directly to some internal control mechanism (e.g., an ECU). The mobile device application may control the ECU (or other in-vehicle system) directly, or provide information to the driver to enable the driver to provide such control.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

What is claimed is as follows:

1. A method, comprising:
   for each of a set of vehicles, receiving one or more performance metrics;
   for each of the one or more routes, receiving geospatial data, the geospatial data comprising a hierarchical spatial data structure that subdivides space into buckets of grid shape;
   for each of the set of vehicles, associating the received performance metrics with buckets of the geospatial data;
   responsive to receipt of a query, and with respect to a particular route associated with the geospatial data, performing a comparative analysis of the performance metrics associated with at least first and second vehicles; and
   based at least in part on a result of the comparative analysis, providing control signaling for an in-vehicle system.

2. The method as described in claim 1 wherein a bucket in hierarchical spatial data structure is associated with a geohash.

3. The method as described in claim 2 wherein the grid shape is defined by one of: an MGRS grid, and any grid defined by an encoding of arbitrary location data into a string mapping.

4. The method as described in claim 1 wherein performing the comparative analysis comprises:
   for the particular route, identifying the buckets through which the particular route passes, and
   identifying a subset of the identified buckets that are common to routes over which the first and second vehicles both passed;
   retrieving the performance metrics for each of the subset of the identified buckets; and
   performing a given function over the retrieved performance metrics for at least one of the identified buckets in the subset.

5. The method as described in claim 4 further including providing an output of the comparative analysis.

6. The method as described in claim 5 wherein the output is one of: a visualization, a notification, a machine learning training model, and an alert.

7. The method as described in claim 1 wherein the query is received programmatically.

8. The method as described in claim 1 wherein the geospatial data is received via an application programming interface (API).

9. The method as described in claim 1 wherein the performance metrics are one of: vehicle speed, engine load, engine speed, fuel rate, transmission gear value, mass air flow, cruise control use, braking data, and acceleration data.

10. The method as described in claim 9 wherein one or more of the performance metrics are associated with a particular time-of-day.

11. The method as described in claim 1 wherein the comparative analysis is carried out periodically, or in response to occurrence of an event.

12. Apparatus, comprising:
a hardware processor, and
a computer memory holding computer program code executed by the hardware processor, computer program code configured to:
for each of a set of vehicles, receive one or more performance metrics;
for each of the one or more routes, receive geospatial data, the geospatial data comprising a hierarchical spatial data structure that subdivides space into buckets of grid shape;
for each of the set of vehicles, associate the collected performance metrics with buckets of the geospatial data;
responsive to receipt of a query, and with respect to a particular route associated with the geospatial data, perform a comparative analysis of the performance metrics associated with at least first and second vehicles; and
based at least in part on a result of the comparative analysis, provide control signaling for an in-vehicle system.

13. The apparatus as described in claim 12 wherein a bucket in hierarchical spatial data structure is associated with a geohash.

14. The apparatus as described in claim 13 wherein the grid shape is defined by one of: an MGRS grid, and any grid defined by an encoding of arbitrary location data into a string mapping.

15. The apparatus as described in claim 12 wherein the computer code to perform the comparative analysis comprises program code further configured to:
for the particular route, identify the buckets through which the particular route passes, and
identify a subset of the identified buckets that are common to routes over which the first and second vehicles both passed;
retrieve the performance metrics for each of the subset of the identified buckets; and
perform a given function over the retrieved performance metrics for at least one of the identified buckets in the subset.

16. The apparatus as described in claim 15 wherein the program code is further configured to provide an additional output of the comparative analysis, the additional output being one of: a visualization, a notification, a machine learning training model, and an alert.

17. A computing system, comprising:
a network-accessible computing platform, the computing platform configured to:
for each of a set of vehicles, receive activity data;
for each of the one or more routes, receive geospatial data, the geospatial data comprising a hierarchical spatial data structure that subdivides space into buckets of grid shape;
for each of the set of vehicles, associate the received activity data with buckets of the geospatial data;
responsive to receipt of a query, and with respect a particular route associated with the geospatial data, perform a comparative analysis of the activity data collected at least first and second vehicles; and
based at least in part on a result of the comparative analysis, provide control signaling for an in-vehicle system.

18. The computing system as described in claim 17 wherein the activity data includes performance metrics obtained from one of: driving of actual vehicles, and driving of simulated vehicles.

19. The method as described in claim 1 wherein the performance metrics for the set of vehicles are obtained from a third party data source.

20. The method as described in claim 1 wherein the performance metrics received are metrics captured as a particular vehicle is driven over or otherwise idled with respect to a route within at least one geospatial bucket.

* * * * *